(12) United States Patent
Biegert et al.

(10) Patent No.: US 9,857,500 B2
(45) Date of Patent: Jan. 2, 2018

(54) METHOD TO CONSTRAIN A BASIN MODEL WITH CURIE DEPTH

(71) Applicants: SHELL OIL COMPANY, Houston, TX (US); SHELL INTERNATIONALE RESEARCH MAATSCHAPPIJ B.V., The Hague (NL)

(72) Inventors: Edward Karl Biegert, Houston, TX (US); Saad Jamil Saleh, Sugar Land, TX (US); Theodericus Johannes Henricus Smit, Risjwijk (NL)

(73) Assignee: SHELL OIL COMPANY, Houston, TX (US)

( * ) Notice: Subject to any disclaimer, the term of this patent is extended or adjusted under 35 U.S.C. 154(b) by 793 days.

(21) Appl. No.: 14/366,320

(22) PCT Filed: Dec. 17, 2012

(86) PCT No.: PCT/US2012/070072
§ 371 (c)(1),
(2) Date: Jun. 18, 2014

(87) PCT Pub. No.: WO2013/096187
PCT Pub. Date: Jun. 27, 2013

(65) Prior Publication Data
US 2014/0365193 A1    Dec. 11, 2014

Related U.S. Application Data

(60) Provisional application No. 61/577,788, filed on Dec. 20, 2011.

(51) Int. Cl.
G06G 7/48 (2006.01)
G01V 3/38 (2006.01)
(Continued)

(52) U.S. Cl.
CPC ............ *G01V 3/38* (2013.01); *G01V 3/081* (2013.01); *G01V 99/005* (2013.01)

(58) Field of Classification Search
CPC ......... G01V 3/38; G01V 3/081; G01V 99/005
(Continued)

(56) References Cited

U.S. PATENT DOCUMENTS

| | | | |
|---|---|---|---|
| 6,932,155 B2 * | 8/2005 | Vinegar | B09C 1/02 166/245 |
| 2007/0032955 A1 | 2/2007 | Williams | |
| 2010/0257004 A1 | 10/2010 | Perlmutter et al. | |

FOREIGN PATENT DOCUMENTS

| | | |
|---|---|---|
| WO | 2009082564 A1 | 7/2009 |
| WO | 20110073861 A2 | 6/2011 |

OTHER PUBLICATIONS

PCT International Search Report, Application No. PCT/US2012/070072 dated Apr. 19, 2013.
(Continued)

*Primary Examiner* — Saif Alhija

(57) ABSTRACT

Methods for constraining basin models to forecast the presence and maturity of hydrocarbon in a basin. The method involves determining a Curie depth at a location at the basin, constraining basin models to match the Curie depth at the location and determining the presence of hydrocarbon in the basin based on the basin models constrained by Curie depth.

10 Claims, 7 Drawing Sheets

(51) Int. Cl.
*G01V 3/08* (2006.01)
*G01V 99/00* (2009.01)

(58) Field of Classification Search
USPC .......................................................... 703/10
See application file for complete search history.

(56) References Cited

OTHER PUBLICATIONS

Prucker et al., 'Crustal Magnetism', Elsevier Treatise on Geophysics, Chap. 6, vol. 5:Goemagnetism, Sep. 20, 2007.
Al-Hajeri et al., "Basin and Petroleum System Modeling", Oilfield Review, Summer 2009, 21, No. 2, pp. 14-29.
Okubo et al., "Curie Point depths of the Island of Kyushu and surrounding areas, Japan", Geophysics vol. 53, No. 3 (1985), p. 481-494.
Li et al., "An integrated geodynamic model of the Nankai subduction zone and neighboring regions from geophysical inversion and modeling," Journal of Geodynamics, 51 (2011) 64-80.
Li et al., "Depths to the magnetic layer bottom in the South China Sea area and their tectonic implications", Geophys. J. Int. 182 (2010), 1229-1247.
Maus et al., "Curie temperature depth estimation using a self-similar magnetization model", Geophys. J. Int. (1997) 129, p. 163-168.
Bansal et al., "Estimation of depth to the bottom of magnetic sources by a modified centroid method for fractal distribution of sources: An application to aeromagnetic data in Germany", Geophysics, vol. 76, No. 3 (May-Jun. 2011); p. L11-L22, 9 Figs., 2 Tables.

* cited by examiner

METHOD TO CONSTRAIN A BASIN MODEL WITH CURIE DEPTH

PRIORITY CLAIM

The present application is a National Stage (§371) application of PCT/US2012/070072, filed Dec. 17, 2012, which claims priority from U.S. Provisional Application 61/577,788, filed Dec. 20, 2011, both of which are hereby incorporated by reference in their entirety.

RELATED CASES

This application claims priority from U.S. application Ser. No. 61/577,788, filed on 20 Dec. 2011 and incorporated herein by reference.

BACKGROUND

This disclosure relates to techniques for investigating subsurface formations and reservoirs. In particular, this disclosure relates to techniques for subsurface investigations involving, for example, basin and petroleum system modeling and Curie depth analysis.

While the demand for petroleum is ever increasing, the cost of exploration to find new reserves is increasing as well. The risk of drilling dry holes and lost investment can be significant. One way to reduce investment risk in oil and gas exploration is to ascertain the presence, types and volumes of hydrocarbons in a prospective structure before drilling. Investigative techniques, such as seismic surveying and interpretation, can be used to delineate closed subsurface structures and identify potential subsurface traps for hydrocarbons, provided such techniques reliably predict the content in the traps. Closed structures, even those located near producing oil fields, may not contain commercially producible amounts of oil or gas.

To obtain knowledge of the type and the volume of hydrocarbons in a prospective subsurface formation before drilling, geologic elements and models can be combined and processed. Investigative techniques, such as basin and petroleum system modeling (basin modeling), may be used to analyze subsurface formations. Basin modeling may allow geoscientists to model aspects of the subsurface formation, such as dynamics of sedimentary basins and their associated fluids. Basin modeling may be used, for example, to generate basin models for determining if past conditions were suitable for hydrocarbons to fill potential reservoirs and be preserved therein.

With basin modeling, the evolution of a basin may be tracked through time as the basin fills with fluids and sediments that may eventually generate or contain hydrocarbons. See for example, Mubarak M. Al-Hajeri et al., "Basin and Petroleum System Modeling", Oilfield Review, Summer 2009, 21, No. 2, pages 14-29, or Thomas Hantschel et al., "Fundamentals of Basin and Petroleum Systems Modeling", Springer-Verlag, 2009. Basin modeling may involve simulating processes, such as sediment deposition, faulting, burial, kerogen maturation kinetics and multiphase fluid flow. Basin modeling can combine data from geology, geophysics, geochemistry, hydrodynamics and thermodynamics.

In concept, basin modeling may be analogous to a reservoir simulation. Reservoir simulators may model fluid flow during petroleum drainage to predict and optimize production, with a distance scale on the order of meters to kilometers and a time scale on the order of months to years. Basin modeling may be used to simulate hydrocarbon-generation processes (e.g., to calculate charge or volume of hydrocarbons available for entrapment, as well as the fluid flow to predict the volumes and locations of accumulations and their properties), with a distance scale on the order of tens to hundreds of kilometers and a time scale on the order of millions of years. In basin modeling, model geometry can be dynamic and change during simulation.

Another investigative technique used to analyze subsurface formations involves a determination of Curie depth. Curie depth is the depth below the earth's surface at which rocks in a specific geographical area encounter the Curie temperature. Curie depth is also the depth at which subsurface materials change from ferromagnetic to paramagnetic, a change which is detectable using magnetic measurements. This depth can be approximated, for example, from aeromagnetic survey data, spectral analysis, or forward modeling.

SUMMARY

This summary is provided to introduce some concepts that are described in details below. This summary is not intended to identify the key or essential features of the claimed subject matter, nor is it to be used in limiting the scope of the claimed subject matter.

The current application discloses methods and apparatuses for basin modeling by constraining some uncertainties and reducing the number of possible models that satisfy the measured data, e.g. magnetic data. According to various embodiments, Curie depth can be used to constrain a geothermal basin model by reducing the possible profiles and uncertainties in the model, and provide reliable determination of the presence and maturity of hydrocarbon in the modeled closed subsurface structure.

The method to constrain basin models may involve determining a Curie depth at a location at a basin, deriving temperature-depth profiles from basin models and eliminating the profiles whose temperature-depth profile does not fall within a range of the Curie depth error at the location, and determining the presence of hydrocarbon in the basin based on a remaining basin model.

The method to constrain models may involve determining a Curie depth at a location or set of locations at a basin, using it as a boundary condition for solving the heat equation and determining the presence of hydrocarbon in the basin based on the basin model.

BRIEF DESCRIPTION OF THE DRAWINGS

A better understanding of the subject matter herein can be had when the following detailed description of the preferred embodiments is considered in conjunction with the following drawings, in which.

DETAILED DESCRIPTION

Reference will now be made in detail to examples of which are illustrated in the accompanying drawings and figures. In the following detailed description, numerous specific details are set forth in order to provide an understanding of various aspects of methods. However, it will be apparent to one of ordinary skill in the art that the methods may be practiced without these specific details. In other instances, well-known methods, procedures, components, and systems have not been described in detail so as not to unnecessarily obscure aspects of the embodiments.

The disclosure relates to techniques for predicting locations of hydrocarbons in subsurface formations. The techniques involve generating profiles (e.g., temperature) of subsurface formations using basin and petroleum system modeling (basin modeling or BPSM). Curie depths may be estimated, and the profiles constrained to selectively eliminate profiles that fail to meet Curie depth criteria and/or select profiles that meet Curie depth criteria.

Figure 1A:
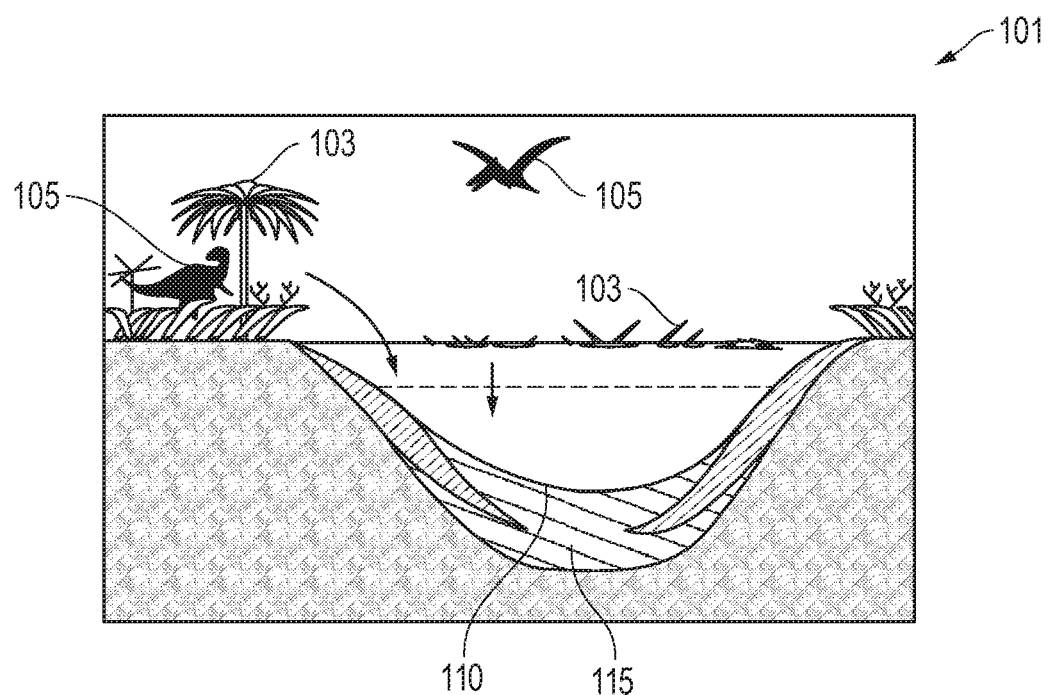
FIGS. 1A and 1B are schematic views of a subsurface formation having a reservoir positioned in a basin.
Figure 1B:
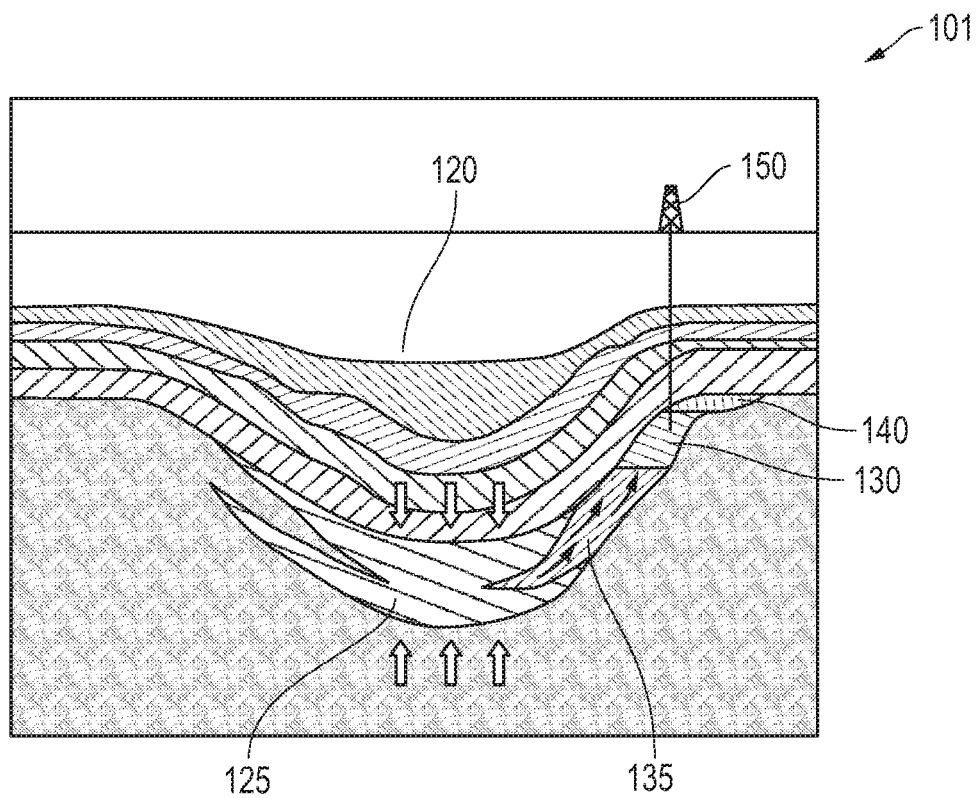

FIGS. 1A and 1B illustrate the formation of a hydrocarbon reservoir, showing a schematic version of a geological formation 101 and depicting the formation of a hydrocarbon reservoir 135 therein. Hydrocarbons may be formed from ancient aquatic plants 103, animals 105 and micro-organisms (not shown) that settle into the geological formation 101. Aquatic plants 103 and animals 105 fall into a basin 110 and form a source rock 115 over time. Other sediments cover aquatic plants 103 and animals 105 and form an overburden 120.

Heat from above and below, and pressure from rocks of the overburden 120, may transform the organic material in the source rock 115 into a kerogen 125 which can mature over time into hydrocarbons (e.g., oil and gas). If there is a trap 130 and seal 140, the hydrocarbons may be preserved in hydrocarbon reservoir 135 in the geological formation 101 for hundreds of millions of years. If located, the hydrocarbon reservoir 135 can be produced by equipment in an oilfield 150. If there is not a trap 130 and seal 140 or such a structure forms after the formation of the hydrocarbon reservoir 135, then the hydrocarbons may escape from the trap 130, resulting in a basin without producible hydrocarbons.

Basin modeling may be used to predict whether basins have producible hydrocarbons and to avoid costly dry holes. Basin modeling may have two parts: model building and forward modeling/model inversion. Model building may involve constructing a structural model and identifying the chronology of deposition and physical properties of layers of the geological formation. Forward modeling may involve performing calculations on the model to simulate changes over time, such as sediment burial, pressure and temperature changes, kerogen maturation, and hydrocarbon expulsion, migration and accumulation.

The model building portion of basin modeling may involve, for example, building a structure model using geological information, such as depth and thickness maps and fault geometries, and timing from seismic, remote-sensing, electromagnetic, gravity, magnetic, outcrop, and well log data. The model building portion of basin modeling may also involve building a geochemical model (including, for example, the temperature, kerogen type, organic richness, thermal maturity and kinetics), and building boundary conditions (including, for example, heat flow history, surface temperature, and paleowater depth). The model building portion of basin modeling may also involve building deposition history (including, for example, timing of the deposition, erosion, hiatus, tectonic events and compaction). The model building portion of basin modeling can be based on data obtained from various types of measurements and sources for each type of model.

The model building portion of basin modeling can be generalized as modeling the generation and maturation of hydrocarbon inside a closed structure, such as the hydrocarbon reservoir 135 of FIG. 1B. A closed structure, such as the reservoir 135 retained by trap 130, may be analogous to a pressure cooker. Organic material (e.g., plants 103 and animals 105) trapped inside the geological formation 101 may be pressurized by the overburden 120 and cooked by heat from above and/or below. Depending on timing in geological scale, content of the reservoir may be: 1) matured to form producible hydrocarbons, 2) premature where producible hydrocarbons have not yet formed, or 3) the content may be over-cooked where producible hydrocarbons are gone.

Figure 2:
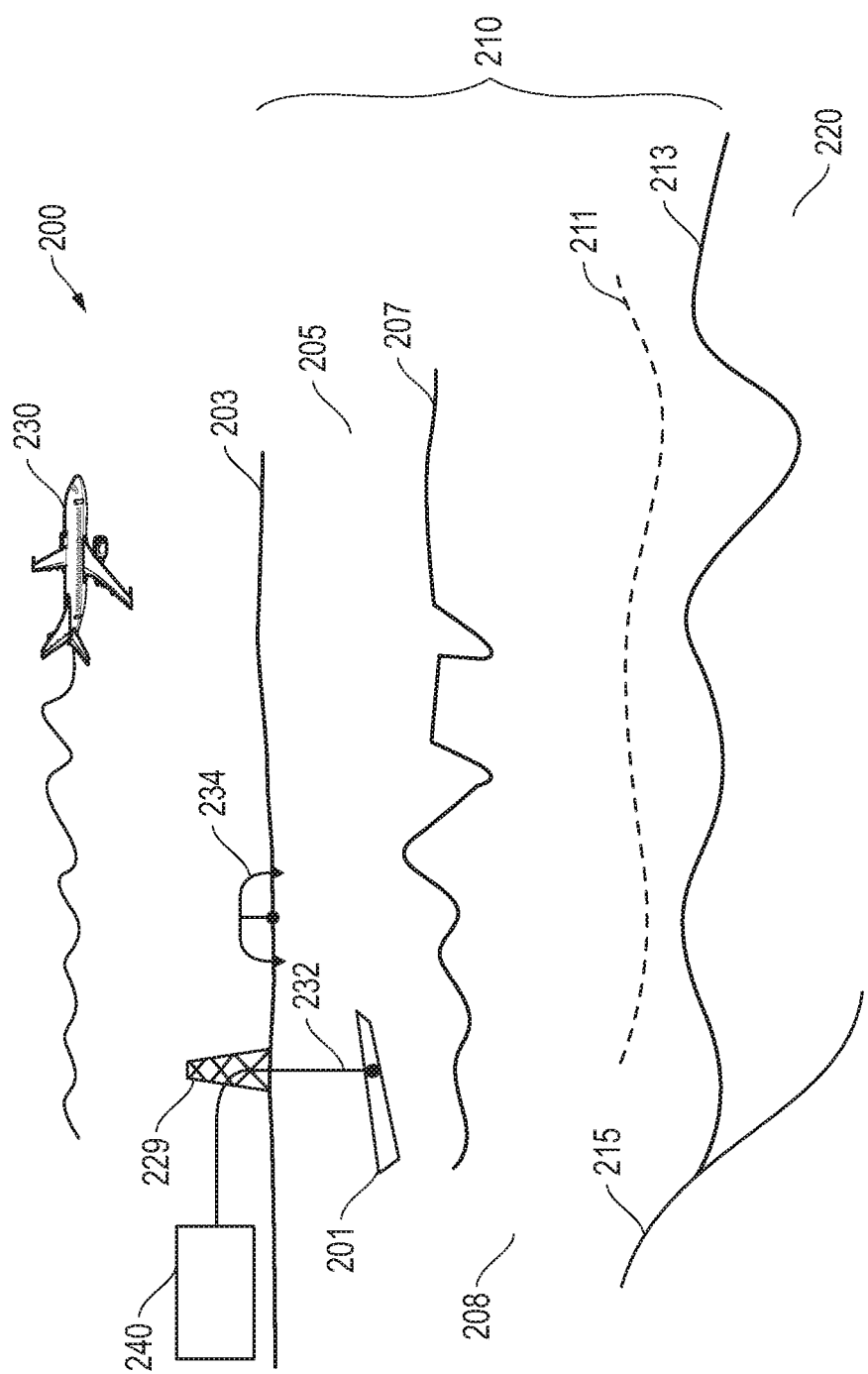
FIG. 2 is a schematic view of a wellsite depicting an oilfield operation and various measurements.

FIG. 2 schematically depicts an oilfield 200 and various measurements that may be made of a geological formation 208. The subsurface formation 208 is part of the earth's crust 210 which includes various layers, such as sediment layer 205 and basement layer 207, positioned below the earth's surface 203. The crust 210 may range from shallow to as deep as 100 kilometers.

Mantle 220 is positioned below the earth's crust 210. Between the solid crust 210 and the more plastic, highly viscous mantle 220 there is an interface called Moho 213. At certain subsurface locations 215, such as continental plate boundaries, volcanoes etc., layers (e.g., Moho 213) of the geological formation 208 may be disrupted. In some cases, such disruptions may expose the mantle 220. Somewhere within crust 210 or mantle 220 is a surface of variable depth called Curie depth 211, which will be discussed in more detail below.

A hydrocarbon reservoir 201 is found in the sediment layer 205 under the surface 203. The reservoir 201 may be shallow (e.g., a few kilometers below the surface 203) in the sediment layer 205. Oilfield equipment 229 may be used to drill a well 232 into the geological formation 208 to reach the reservoir 201 and produce hydrocarbons therefrom. The oilfield equipment 229 may include controller 240 used to control various operations at the oilfield 200.

Various geological measurements, such as gravity, may be collected before the oilfield is located and/or during oilfield operations (e.g., drilling, production, etc.) This information can be used, for example, in operating the oilfield equipment 229 or locating a position for a new well. Collected shallow and/or deeper data may be used, for example, to determine geological parameters that characterize the earth's structures and properties, and/or in basin modeling. In some cases, measurements may be made at shallow depths of about a few kilometers or less with equipment from the earth's surface or in wells. For example, seismic data may be collected using seismic equipment 234 on the earth's surface 203 and/or using downhole tools positioned inside the well 232. Such downhole tools may also be used to collect other data, such as physical, chemical, and/or geological data, from inside the well 232.

In subsurface earth, temperature may increase with depth. To obtain insights into subsurface formations and reservoirs located at greater depths, an analysis of subsurface parameters, such as Curie depth and Curie temperature, may be used. As referred to herein, Curie temperature of a piece of material refers to a temperature where the material loses its magnetism (e.g. a ferromagnetic material becomes paramagnetic), and Curie depth (e.g. as shown in FIG. 2, Curie depth 211) refers to the depth at which rocks in a specific geographical area encounter the Curie temperature and change from ferromagnetic to paramagnetic. Curie temperature for the earth's crust may be between about 550° C. to about 600° C., depending on the types of the rocks in the earth's crust at a given location. Curie depth may be on the order of about 20 km to about 40 km, but can be shallower or deeper depending on the location. In another example, near an active volcano or ocean spreading centers, the Curie depth may be very shallow. Techniques for determining Curie depth are described further herein.

Referring to FIGS. 3-6, techniques are described for modeling reservoirs, such as reservoir 201 of FIG. 2, as constrained by Curie depth. Basin modeling may be used for model generation and maturation of hydrocarbons of the oilfield. Basin modeling can involve simulating, for example, temperature profiles in depth in the earth and its history over geological time; thermal properties of a basin and its history over time; and/or thermal and chemical properties of kerogen in a basin and its history.

Curie depth can be used in building structural models of the earth, such as geothermal and basin modeling. Curie depth may be used to understand earthquake seismicity and deep crustal structures of the earth (e.g., subducting plates, etc.), and/or for estimating crustal geotherms, among others. The Curie depth may provide an intermediate depth constraint on geothermal and basin modeling, which may be otherwise loosely constrained by relatively shallow well data (e.g., in a range of from about zero km deep to about several kilometers deep). For example, a Curie depth isotherm may be used as a control surface in basin modeling to limit the range of possible geothermal profiles that may otherwise fit the shallow temperature data. The Curie depth isotherm may also be used as a boundary condition to solve a heat equation. The Curie depth may eliminate many possible profiles and, thus, reduce uncertainties in the models and their predictions.

Figure 3:
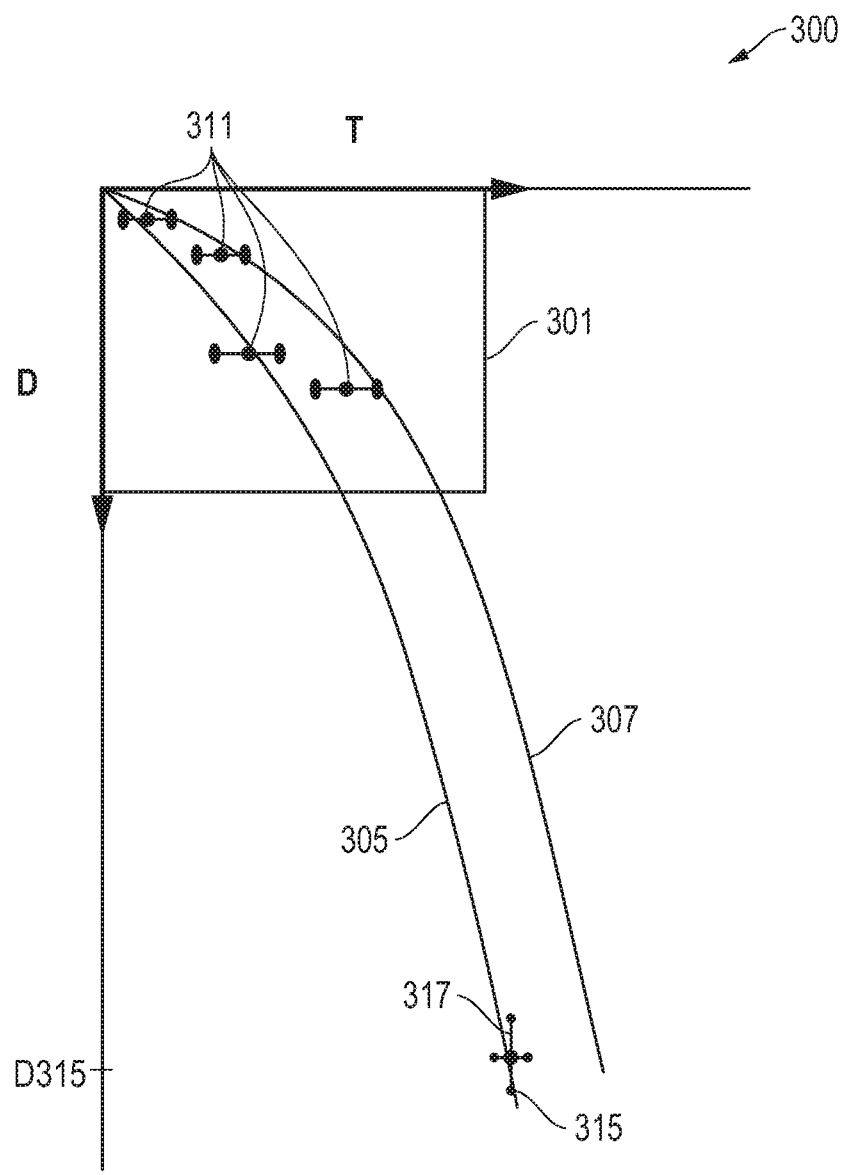
FIG. 3 is a graph depicting temperature profiles of a subsurface formation with a range of profiles derived from basin models.

FIG. 3 is a graph 300 depicting temperature profiles 305, 307 derived from several basin models. The temperature profiles 305, 307 may be formed from a plot of temperature (T) (x-axis) versus depth (D) (y-axis). The range of possible geothermic profiles is characterized by temperature profiles 305 and 307 (and those not shown that may be present therebetween), spanning a fairly large range. The graph 300 also includes shallow temperature data 311 and Curie temperature data 315. The shallow temperature data 311 may be, for example, measurements taken from wells (e.g. 232 of FIG. 2) at depths ranging from about 0 km to less than about 6 km (e.g., within the box 301).

The Curie depth 315 may be determined by various methods, such as using the airplane 230 of FIG. 2. The Curie temperature and Curie depth 315 are plotted on the graph 300 at depth D315 with error bars 317 indicating possible uncertainty in the estimation at a depth $D_{315}$ (e.g., of about 20 km). With the addition of Curie depth 315, profile 305 may be selected as a viable profile and/or profile 307 may be eliminated. In this example, only profiles producing temperature depth profiles consistent with profile 305 are viable. Criteria, such as error limits, may be selected for determining which of the profiles are classified as viable. In this manner, the Curie depth may be used to reduce uncertainty in the resulting model.

Figure 4:
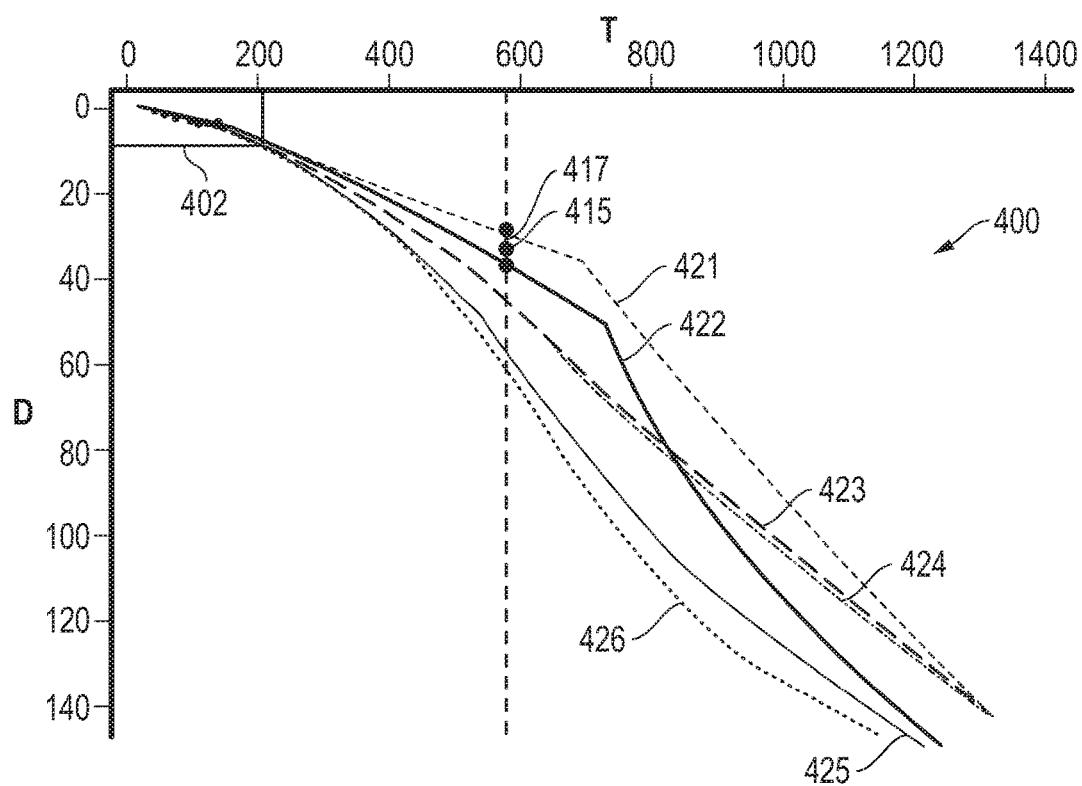
FIGS. 4 and 5 are graphs depicting geothermal profiles of a subsurface formation derived from basin models.
Figure 5:
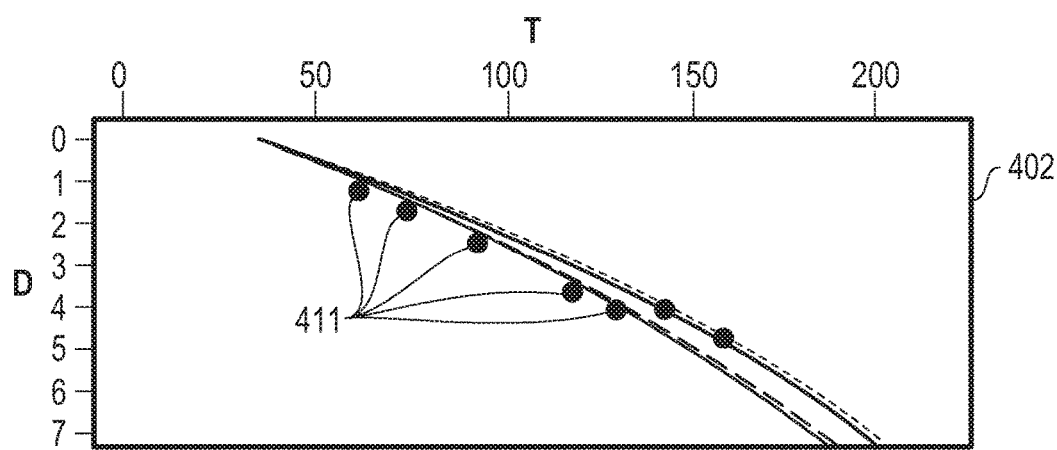

FIG. 4 is a graph 400 depicting other temperature profiles 421-426 derived from basin modeling. FIG. 5 shows a shallow portion 402 of the graph 400 of FIG. 4 in greater detail. The temperature profiles in this example may be formed from a plot of temperature (T) (x-axis) versus depth (D) (y-axis) of six possible geothermic profiles generated from shallow data 411. As shown in a shallow portion 402 of the graph 400, all of the profiles 421-426 fit with the shallow data 411, and cannot be distinguished based solely on the shallow data 411.

Curie temperature and depth 415 provides a way to distinguish between profiles 421-426 at greater depths where the profiles may diverge as shown. In this case, a known Curie temperature of about 580 C and a corresponding Curie depth 415 at about 22-32 km is provided. The Curie depth may be used to reduce the number of possible profiles to those that fall within error bars 417 of the Curie depth 415, such as profiles 421 and 422.

Figure 6:
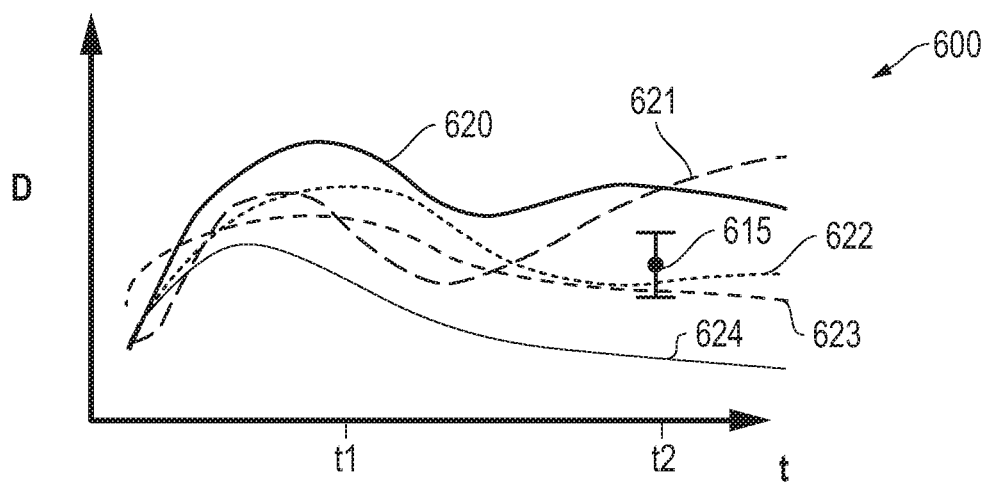
FIG. 6 is a graph depicting isotherms constrained by Curie depth.

FIG. 6 is a graph 600 depicting other isotherms 620-624 derived from basin modeling. The isotherms in this example may be formed from a plot of Curie depths (D) (y-axis) over time (t) (x-axis). These isotherm profiles show examples of using Curie depths used to constrain history properties of profiles in modeling, and show the evolution of Curie depths over time.

Due to the dynamics of the structural changes, material movements etc., the temperature in the earth's crust changes over time, for example, from historic time $t_1$ to current time $t_2$. Isotherms derived from viable profiles may be analyzed with the current Curie depth 615 for consistency. The Curie depth 615 (with its error bands) may be plotted at time $t_2$ for comparison with the various profiles 620-624. As shown, this reduces the possible profiles to two feasible profiles 622, 623.

Figure 7:
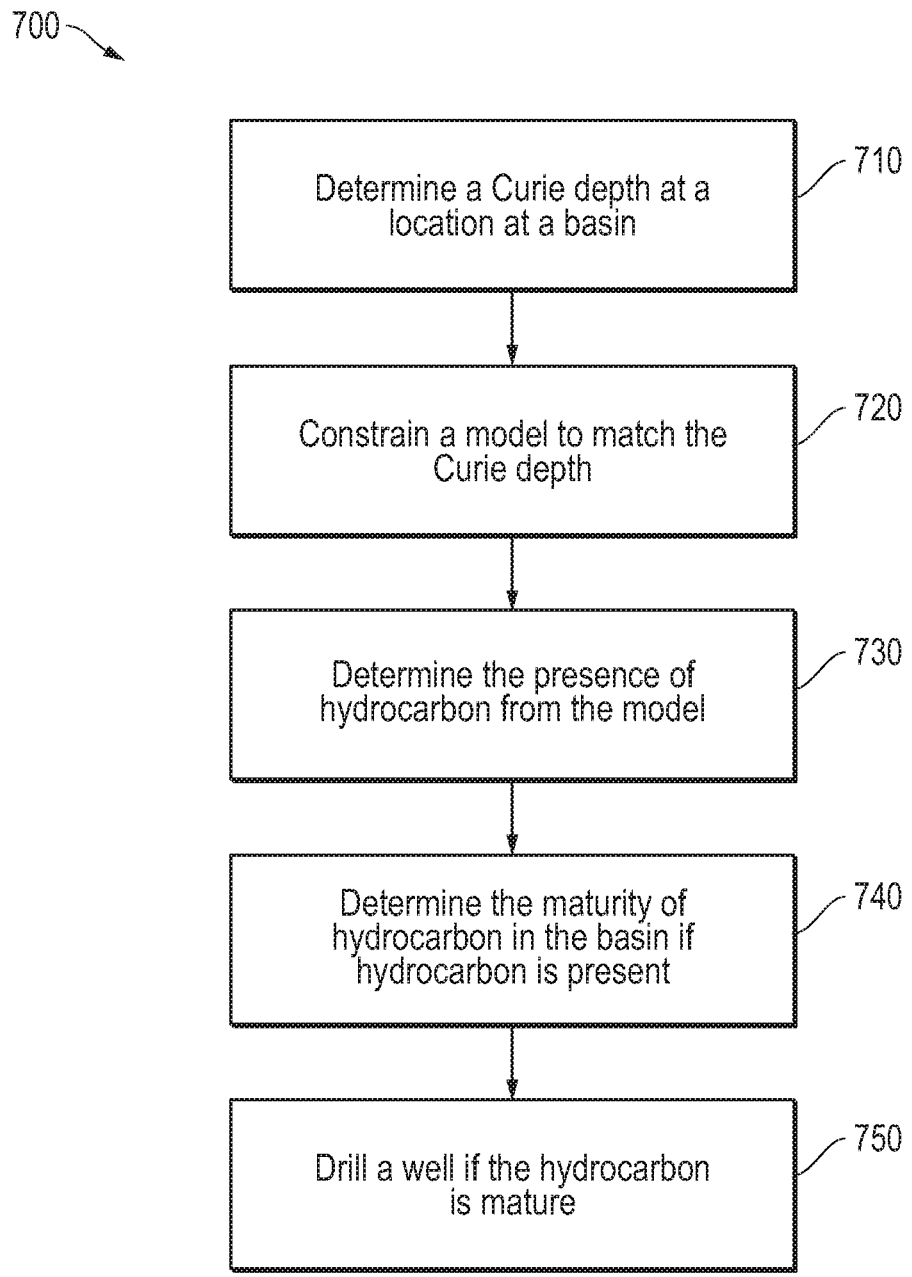
FIG. 7 shows a flow diagram of a method of constraining basin models using Curie depth.

FIG. 7 illustrates a flow diagram of a method 700 using Curie depth to constrain basin models. The method 700 may involve determining a Curie depth at a location of interest (710). Various techniques may be used to obtain Curie depth. The magnetic change at the Curie depth 211 may be detected, for example, using the magnetic measurements, such as aeromagnetic surveys by an airplane 230 above the earth's surface 203 as shown in FIG. 2. Such magnetic measurements may be surface magnetic measurements, such as airborne as shown by airplane 230 as well as satellite, marine and other measurements which are made at or near the earth's surface. Gravity and other data may also be collected in the airplane 230. There may be some temperature estimates from deep base lithosphere data from about 100 km or deeper.

Curie depth 211 at a given location may involve both the earth geothermal field and its magnetic field. At the bottom of the earth's magnetic layer, an undulating surface in the earth's interior is present at the Curie depth 211, below which rocks reach their Curie temperature and lose their ferromagnetism. Therefore, direct inversion of surface magnetic data is one way of determining the Curie depth. This method can use gridded regional aeromagnetic data. The method may include inverting the gridded data based upon a distribution of point dipoles, an estimation of coordinates of a centroid of distribution by computing a least squares fit to the radial frequency of a Fourier transform, and an estimation of centroid depth by computing a least square fit to the squared amplitude of the frequency estimates. An average depth to a top of a collection of dipoles can be estimated. The average depth to a bottom of the dipoles, which is the Curie depth, may then be computed. See for example, Okubo et al., "Curie Point depths of the Island of Kyushu and surrounding areas, Japan", Geophysics Vol. 53, No. 3 (1985), p. 481-494.

Another way of computing Curie depth using magnetic data is to use a spectral depth model, for example, with a wavenumber-domain centroid. Such a method uses windowing on regional magnetic anomalies. With an assumption of random magnetizations within each window, the centroid method linearizes the radially averaged amplitude spectrum of the magnetization model in the logarithmic space at middle to high wavenumber bands and low wavenumber bands respectively. The depths to a top and centroid of magnetic sources can be estimated from least-squares regressions within these localized wavenumber bands, and the depth to a bottom of a magnetic source can be calculated from depths to a top and centroid. This process may continue until the depth for all windows are estimated. See for example, Li et al., "An integrated geodynamic model of the Nankai subduction zone and neighboring regions from geophysical inversion and modeling," Journal of Geodynamics, 51 (2011) 64-80, or Li et al., "Depths to the magnetic layer bottom in the South China Sea area and their tectonic implications", Geophys. J. Int. 182 (2010), 1229-1247.

Another method of computing the Curie depth using magnetic data involves using a spectral density model for the anomaly of the total intensity of the magnetic field. A model may be derived from a power spectrum due to a slab carved out of a self-similar magnetization distribution. At short wavelengths, the power increases rapidly towards longer wavelengths as expected for a self-similar magnetized crust with unlimited depth extent. However, at long wavelengths, the power may increase less rapidly, indicating an absence of deep-seated sources, and further indicating that crustal magnetization may be limited. A boundary of change in magnetization can be identified as the Curie depth. From spectral density model, the Curie depth may be determined. See for example, Maus et al., "Curie temperature depth estimation using a self-similar magnetization model", Geophys. J. Int. (1997) 129, p 163-168.

The method may further involve constraining a basin model including a plurality of profiles so as to be consistent with the determined Curie depth at the location of interest (720) (see, e.g., FIGS. 3-6). An inversion may be performed with various types of geothermal profiles, including, but not limited to, temperature-depth profiles, temperature-histories, surface temperature or heat flow histories etc.

Using estimated Curie depth, one can constrain the various parameters, including the thermal rock properties and their associated geologic structure, that go into a dynamic basin model used to predict and de-risk the presence and thermal maturity of hydrocarbons in the basin. With Curie depth, one can constrain the thermal rock properties of the subsurface, constrain the geologic structure, match the observed and predicted geothermal field, match vitrinite reflectance, and match/constrain the presence, distribution, and thermal maturity of hydrocarbons.

The Curie depth is independent from various other constraint or control points used in basin modeling. While geophysical modelers rely on their geologic and geochemical experience and intuition to choose among calculated geothermal profiles, the use of Curie depth can eliminate many possible profiles that otherwise may need modeler review and intervention. This analysis may be used to reduce the viable profiles, thereby reducing the time needed for analysis of profiles. As shown in FIG. 3, a geophysical modeler might select profile 307 to be the most likely model for the basin's actual properties. Curie depth indicates that the basin model is closer to profile 305. The use of Curie depth corrects the modeler's best estimate by eliminating profiles from the model based on quantifiable criteria. Once using Curie depth to reduce the number of possible profiles, a modeler may determine the most likely basin model from a smaller pool of profiles.

From the selected basin model, the modeler can determine many other properties, such as the presence of hydrocarbon, from the basin model (730). If hydrocarbon is determined to be present, then the method may also involve determining from the model the maturity of hydrocarbon (740). The hydrocarbon maturity is another result that may be generated by the basin model. If so, he may further determine the maturity of hydrocarbon in the basin which changes over time and the maturity at the present time. This may be determined, for example, using vitrinite reflectance. If hydrocarbon is determined to be mature (e.g., appropriate for drilling), the method may also involve drilling a well (750). If the model indicates otherwise, then a potentially costly non-productive well may be avoided.

The method may be performed in any order, and repeated as desired. Not all steps in method 700 are required. For example, in many projects, the modeling and determination of the presence of hydrocarbon is a goal which can help decision making at an oil/gas lease sale. For such projects, a drilling operation may optionally be avoided.

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. The process of measurement, its interpretation and actions taken by operators may be done in an iterative fashion; this concept is applicable to the methods discussed herein. Finally, portions of methods may be performed by any suitable techniques, including on an automated or semi-automated basis on computing system.

Figure 8:
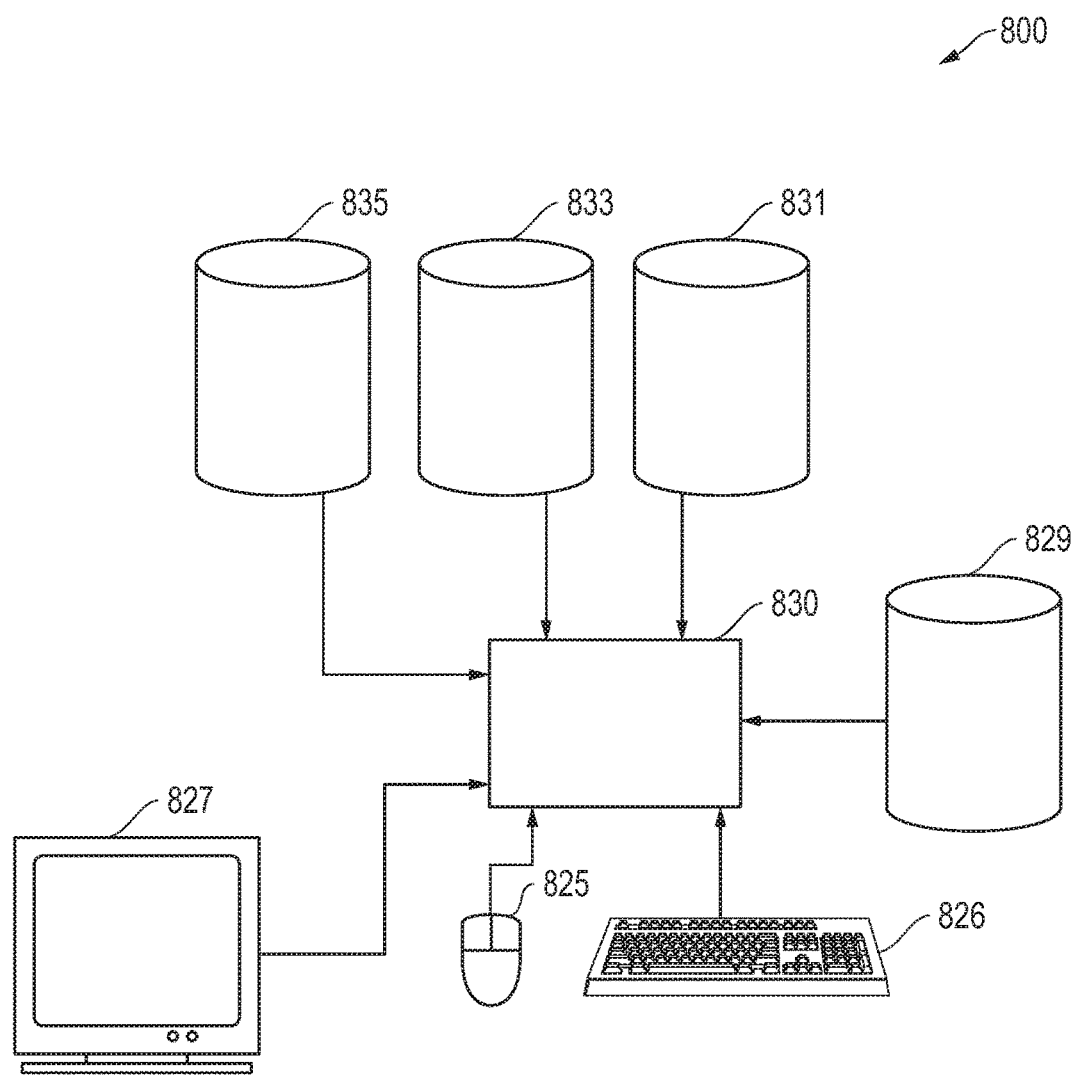
FIG. 8 shows a computer system usable in implementing aspects of the disclosure.

Portions of methods described above may be implemented in a computer system 800, one of which is shown in FIG. 8. The system computer 830 may be in communication with disk storage devices 829, 831, 833 and 835, which may be external hard disk storage devices, and measurement sensors (not shown). It is contemplated that disk storage devices 829, 831, 833 and 835 are conventional hard disk drives, and as such, will be implemented by way of a local area network or by remote access. Of course, while disk storage devices are illustrated as separate devices, a single disk storage device, a solid state storage device or a cloud storage may be used to store any and all of the program instructions, measurement data, and results as desired.

In one implementation, system computer 830 is imbedded in a controller, similar to controller 240 as shown in FIG. 2. The computer system 830 may collect various measurements from the well and process the data there to provide assistance in decision making regarding the operation of the well.

In many other implementations, system 830 is in an office setting located apart from field operations. System 830 may be in communication with field operations. Various data from different sources may be stored in disk storage device 833. The system computer 830 may retrieve the appropriate data from the disk storage devices 831 or 833 to process data according to program instructions that correspond to implementations of various techniques described herein. The program instructions may be written in a computer programming language, such as C++, Java and the like. The program instructions may be stored in a computer-readable medium, such as program disk storage device 835. Such computer-readable media may include computer storage media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 830. Combinations of any of the above may also be included within the scope of computer readable media.

In one implementation, the system computer 830 may present output primarily onto graphics display 827, or alternatively via a printer (not shown). The system computer 830 may store the results of the methods described above on disk storage 829, for later use and further analysis. The keyboard 826 and the pointing device (e.g., a mouse, trackball, or the like) 825 may be provided with the system computer 830 to enable interactive operation.

While FIG. 8 illustrates the disk storage, e.g. 831 as directly connected to the system computer 830, it is also contemplated that the disk storage device may be accessible through a local area network or by remote access. Furthermore, while disk storage devices 829, 831 are illustrated as separate devices for storing input petroleum data and analysis results, the disk storage devices 829, 831 may be implemented within a single disk drive (either together with or separately from program disk storage device 833), or in any other conventional manner as will be fully understood by one of skill in the art having reference to this specification.

The terminology used in the description herein is for the purpose of describing particular embodiments only and is not intended to be limiting of the invention. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A method comprising:
    forecasting the presence of hydrocarbons in a basin of a geological formation at a location, by:
        obtaining a plurality of basin models for the basin;
        determining a Curie depth at the location;
        constraining the plurality of basin models based on the Curie depth at the location; and
        determining the presence of hydrocarbon in a reservoir in the basin based on the constrained plurality of basin model;
    and thereafter drilling a well into the geological formation to reach the reservoir and produce the hydrocarbons therefrom.

2. The method in claim 1, further comprising determining maturity of the hydrocarbons in the basin if hydrocarbons are determined to be present in the basin.

3. The method in claim 2, further comprising drilling the well if the hydrocarbons are mature.

4. The method in claim 1, wherein the Curie depth is determined using information selected from the group consisting of magnetic measurements, direct inversion of magnetic measurements, spectral depth models, and a spectral density model for an anomaly of total intensity of a magnetic field.

5. The method in claim 1, wherein constraining comprises:
    deriving temperature-depth profiles from the plurality of basin models; and
    eliminating at least one of the plurality of basin models whose temperature-depth profile or temperature history does not fall within an error band of the Curie depth at the location.

6. The method in claim 1, further comprising using the Curie depth to constrain at least one thermal rock property or at least one vitrinite reflectance.

7. A method comprising:
    constraining basin models to forecast the presence of hydrocarbons in a basin of a geological formation at a location, by:
        determining a Curie depth at the location;
        deriving temperature-depth profiles from a plurality basin models;
        eliminating any of the plurality of basin models whose temperature-depth profiles do not fall within an error band of the Curie depth at the location; and
        determining the presence of hydrocarbons in a reservoir in the basin using a remaining basin model;
    and thereafter drilling a well into the geological formation to reach the reservoir and produce the hydrocarbons therefrom.

8. The method in claim 7, further comprising using the Curie depth to constrain at least one thermal rock property or at least one vitrinite reflectance.

9. A method comprising:
    constraining basin models to forecast the presence of hydrocarbons in a basin of a geological formation at a location, by:
        determining a Curie depth at the location;
        deriving temperature histories from the basin models;
        eliminating any of the plurality of basin models whose temperature-depth profiles do not fall within an error band of the Curie depth at the location; and
        determining the presence of hydrocarbons in a reservoir in the basin using a remaining basin model;
    and thereafter drilling a well into the geological formation to reach the reservoir and produce the hydrocarbons therefrom.

10. The method in claim 9, wherein said deriving of the temperature histories comprises simulating the history of temperature-depth profiles over geological time from the basin models, thereby deriving isotherms from a plot of Curie depths over time.

* * * * *